US012533575B2

(12) United States Patent
Lee et al.

(10) Patent No.: US 12,533,575 B2
(45) Date of Patent: Jan. 27, 2026

(54) ROOM CONTOUR DETERMINATION FOR COMPUTING SESSION DISPLAYS USING LOCATION TAGS

(71) Applicant: Dell Products L.P., Round Rock, TX (US)

(72) Inventors: Hsu-Feng Lee, Taipei (TW); Wei-Hsiang Chi, Taipei (TW); Gerald Rene Pelissier, Mendham, NJ (US); Jheng-Ting Ye, Taipei (TW); Yi-Ming Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 398 days.

(21) Appl. No.: 18/150,655

(22) Filed: Jan. 5, 2023

(65) Prior Publication Data
US 2024/0230829 A1 Jul. 11, 2024

(51) Int. Cl.
*A63F 13/27* (2014.01)
*G01S 5/02* (2010.01)

(52) U.S. Cl.
CPC ............ *A63F 13/27* (2014.09); *G01S 5/0264* (2020.05); *G01S 5/0289* (2013.01); *G01S 2205/02* (2020.05)

(58) Field of Classification Search
CPC ...... A63F 13/27; G01S 5/0264; G01S 5/0269; G01S 2205/02; G01S 5/14
See application file for complete search history.

(56) References Cited

U.S. PATENT DOCUMENTS

| 8,548,738 | B1* | 10/2013 | Kadous | G01C 21/206 |
| | | | | 701/434 |
| 9,541,404 | B2* | 1/2017 | Yang | G01S 19/03 |
| 9,807,725 | B1* | 10/2017 | Vitus | H04W 4/02 |
| 10,701,661 | B1* | 6/2020 | Coelho | H04W 4/023 |
| 11,815,357 | B2* | 11/2023 | Zu | G06Q 30/0261 |
| 2019/0246241 | A1* | 8/2019 | Hollar | H04W 4/33 |
| 2020/0360803 | A1* | 11/2020 | Collins | G06F 3/011 |
| 2022/0114791 | A1* | 4/2022 | Fleischman | G06F 3/04842 |
| 2022/0244367 | A1* | 8/2022 | Shin | G01S 11/04 |
| 2022/0291693 | A1* | 9/2022 | Kim | A47L 11/4061 |
| 2023/0217215 | A1* | 7/2023 | Russell | H04W 48/16 |
| | | | | 455/456.3 |
| 2024/0029352 | A1* | 1/2024 | Wan | G06T 7/12 |

* cited by examiner

Primary Examiner — James S. McClellan
(74) Attorney, Agent, or Firm — Norton Rose Fulbright US LLP

(57) ABSTRACT

Systems and methods described herein may provide a system that enables determining of room contours based on location tags and path information for paths traveled between the location tags. A computing device may receive identifiers for a plurality of location tags added to an environment and may receive path information for a plurality of paths between the plurality of location tags. The computing device may identify a plurality of room contours based on the path information and may determine, based on the plurality of room contours and at least one of the plurality of location tags, a display for use in a computing session.

17 Claims, 11 Drawing Sheets

ROOM CONTOUR DETERMINATION FOR COMPUTING SESSION DISPLAYS USING LOCATION TAGS

FIELD OF THE DISCLOSURE

The instant disclosure relates to information handling systems. More specifically, portions of this disclosure relate to techniques for determining room contours using location tags.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and/or characteristics of the devices. This knowledge graph may be updated in real time and/or based on changes in device telemetry.

According to one aspect, a method for execution by an information handling system, such as a hub device, includes receiving identifiers for a plurality of location tags added to an environment; receiving path information for a plurality of paths between the plurality of location tags; identifying a plurality of room contours based on the path information; and determining, based on the plurality of room contours and at least one of the plurality of location tags, a display for use in a computing session.

In some aspects, the techniques described herein relate to a method, wherein the path information includes location information for a computing device as the computing device traveled along at least a subset of the plurality of paths.

In some aspects, the techniques described herein relate to a method, wherein the location information is determined based on one or more sensor measurements from the computing device.

In some aspects, the techniques described herein relate to a method, wherein the location information is determined based on distance measurements between the computing device and at least a subset of the plurality of tags.

In some aspects, the techniques described herein relate to a method, wherein the method further includes: combining the path information into a consolidated path representative of at least a subset of the plurality of paths; determining a plurality of candidate areas based on the consolidated path; and identifying the plurality of room contours as encompassing the plurality of candidate areas.

In some aspects, the techniques described herein relate to a method, wherein the candidate areas are determined by dividing spaces between different portions of the consolidated path.

In some aspects, the techniques described herein relate to a method, wherein the path information includes image data captured by a computing device as the computing device traveled along at least a subset of the plurality of paths.

In some aspects, the techniques described herein relate to a method, wherein identifying the plurality of room contours includes: determining, based on the image data, at least one of (i) distances to walls along at least the subset of the plurality of paths or (ii) locations of doors along at least the subset of the plurality of paths; and updating the candidate areas based on the at least one of the distances to walls and locations of doors.

In some aspects, the techniques described herein relate to a method, wherein identifying the plurality of room contours includes: determining room contour estimates based on the candidate areas; and updating, by a model, the room contour estimates to form the plurality of room contours, wherein updating the room contour estimates includes extending the room contour estimates such that at least a subset of the plurality of room contours align.

In some aspects, the techniques described herein relate to a method, wherein determining the display includes: determining a position for an I/O device to be used during the computing session; determining a current room of the I/O device based on the position and the room contours; and identifying the display as being located in the current room.

In some aspects, the techniques described herein relate to a method, wherein the plurality of location tags include ultra-wide band location tags.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
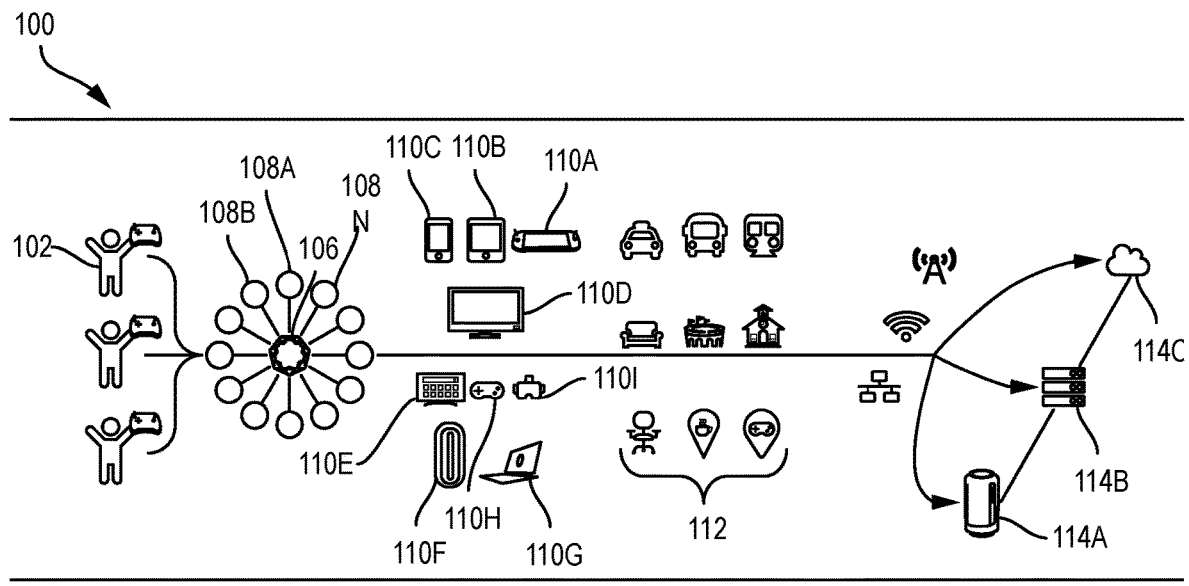
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game or other application requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application sessions for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, gaming controller and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
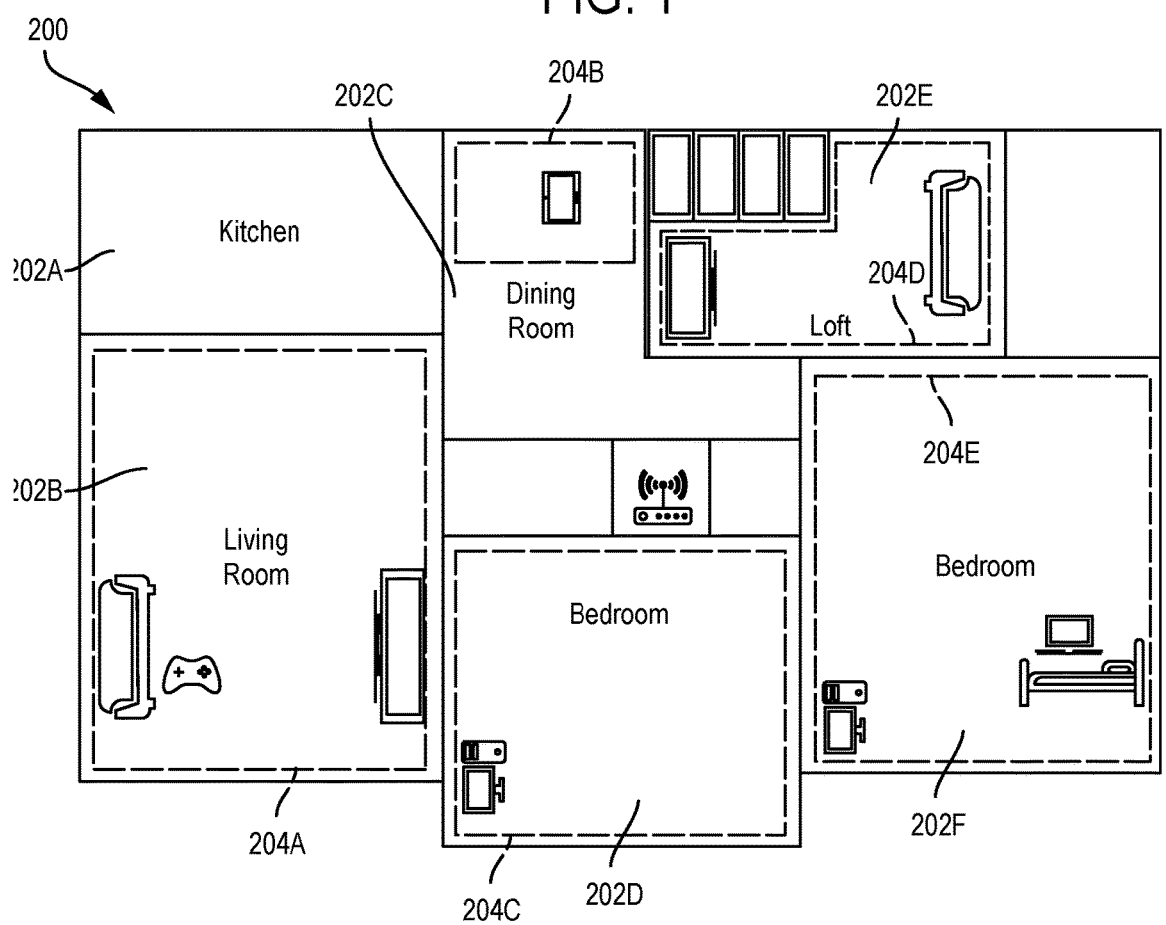
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, an application or other computing services manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
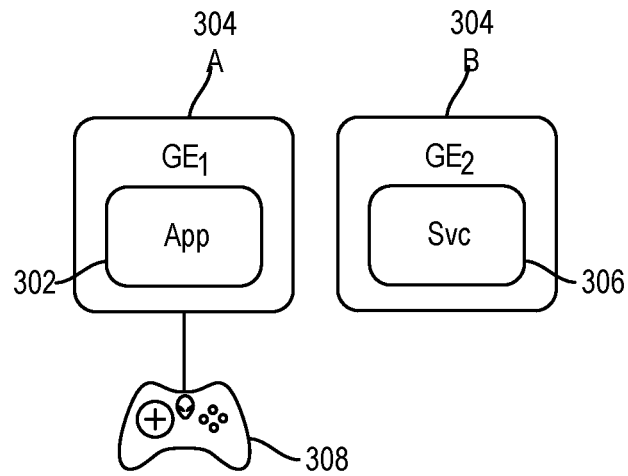
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
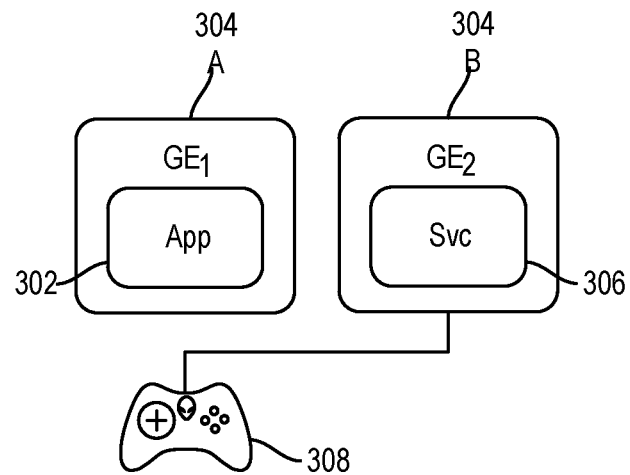
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
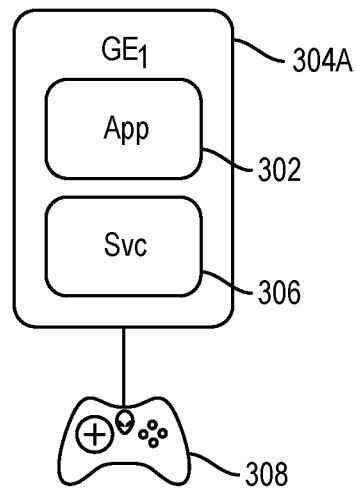
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
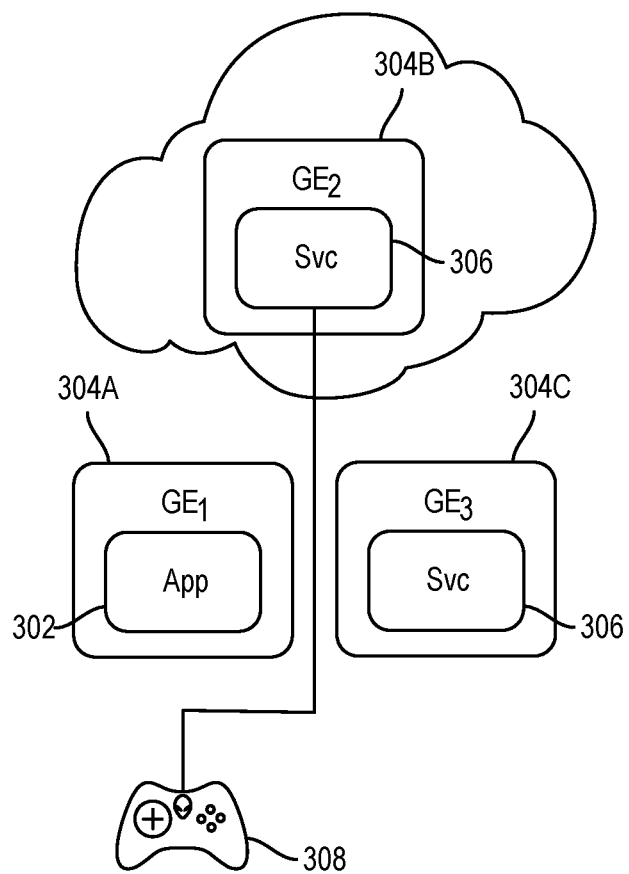
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Users may accordingly be able to utilize different computing services (such as gaming services) across different combinations of peripherals, I/O devices, displays, computing devices, and the like. I/O devices, which may conventionally be interacted with by contact or near field interaction, may follow a user as they move between different locations or rooms and thus as the user interacts with different computing devices. To ensure that a user, when interacting with an I/O device, is able to manipulate a desired computing device, it may accordingly be necessary to detect where the I/O device is, and which device should be controlled by inputs to the I/O device. However, it may still be necessary to map an environment with reasonable accuracy to assist users with locating devices and to identify which devices should be controlled.

One solution to this problem is to utilize location tags in combination with path information for paths walked between the location tags within an environment to be mapped. Candidate areas may then be identified based on the paths, such as based on location information for a device that travelled along the paths. These candidate areas may then be used to determine one or more room contours, such as by extending the candidate areas to form complete room contours. In certain implementations, one or more predictive models may be used to determine the room contours based on the candidate areas. In certain implementations, image data from one or more rooms may be used to supplement the path information, such as for use in identifying walls and doors that separate rooms within the environment.

Figure 4:
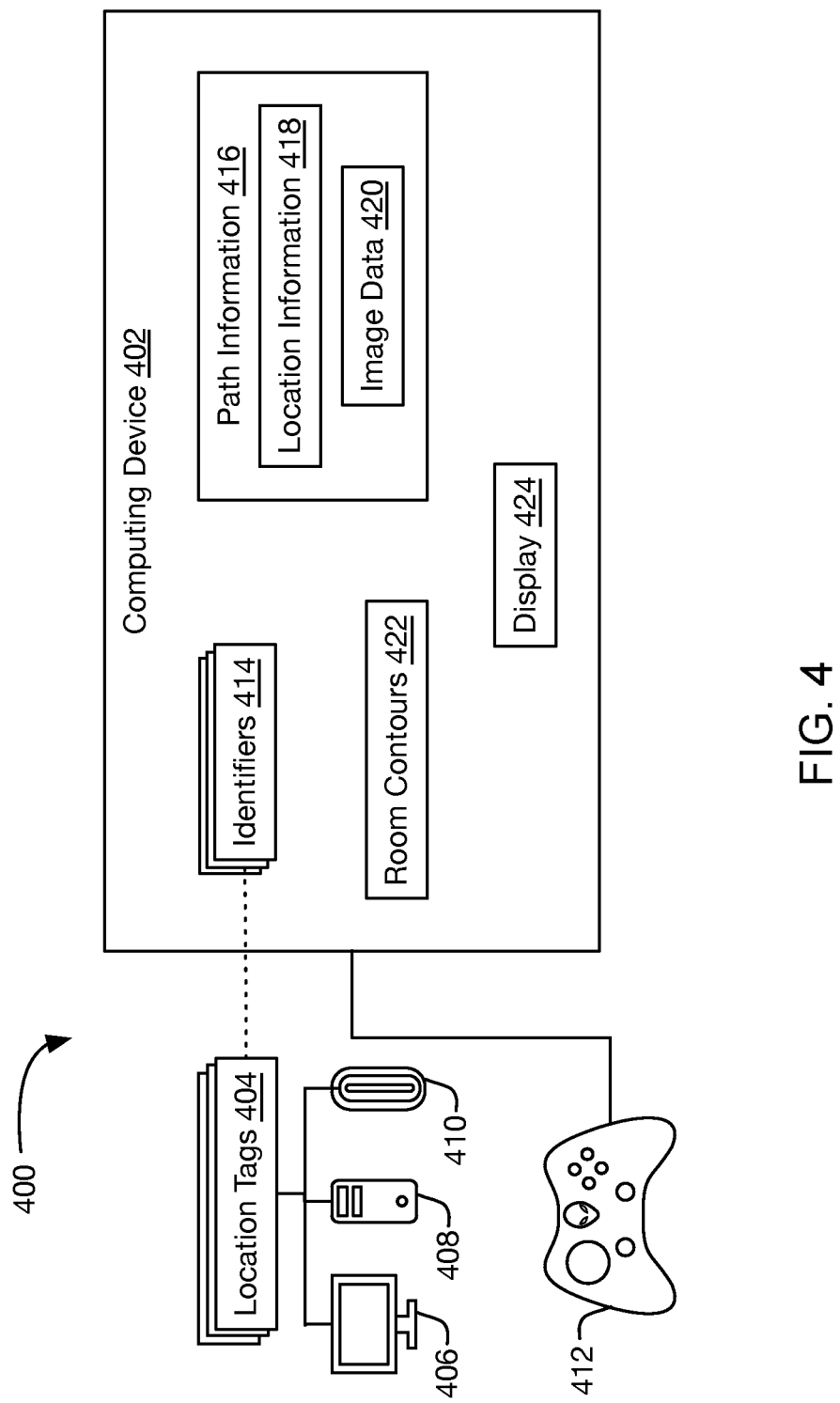
FIG. 4 depicts a system for determining room contours according to an exemplary embodiment of the present disclosure.

FIG. 4 depicts a system 400 for determining room contours according to an exemplary embodiment of the present disclosure. The system 400 includes a location tags 404, devices 406, 408, 410, an I/O device 412, and a computing device 402. The computing device 402 includes identifiers 414, path information 416, room contours 422, and a display 424. The path information 416 includes a location information 418, an image data 420. In particular, the computing device 402 may be configured to determine room contours 422 for an environment (such as a building or other facility) in which the location tags 404 are located and to use the room contours 422 to determine displays (such as the display 424) for use during computing sessions.

The computing device 402 may be configured to receive identifiers 414 for a plurality of location tags 404 added to an environment. In certain implementations, the location tags 404 are configured to emit a wireless signal that can be used to measure a distance between the location tags 404 and one or more other computing devices. In certain implementations, the plurality of location tags 404 include ultra-wide band (UWB) location tags 404. In additional or alternative implementations, the plurality of location tags 404 may additionally or alternatively include one or more Bluetooth Low Energy (BLE) tags, radio frequency identifier (RFID) tags, and the like. In certain implementations, the identifiers 414 may include a unique identifier (such as a universally unique identifier (UUID)) for each of the plurality of location tags 404. The identifiers 414 may also indicate a room within the house in which the location tags 404 are located and/or an associated device 406, 408, 410 for the locations tags 404 (such as a personal computing device, a gaming computing device, a gaming console, a display, or any other computing device capable of executing computing processes on behalf of the user or displaying the results of computing processes). In certain implementations, the location tags 404 may be installed next to a gaming device, such as near a display used while playing video games. In certain implementations, the identifiers 414 may be received via a computing device (such as a smartphone or other mobile computing device). For example, a user may enter information into the computing device 402 via a location platform or other computing platform. For example, a mobile computing device may be used to enroll one or more location tags within a computing environment, and a user may be prompted to identify a room in which the location tag will be placed and/or a computing device 406, 408, 410 corresponding to the location tag 404.

Figure 5A:
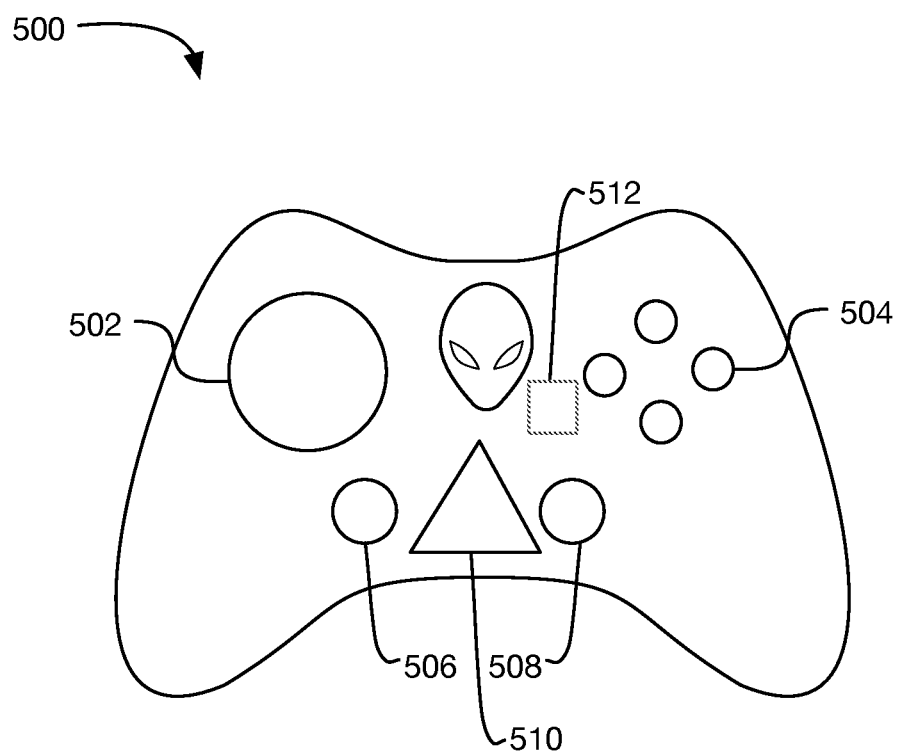
FIG. 5A depicts a controller according to an exemplary embodiment of the present disclosure.
Figure 5B:
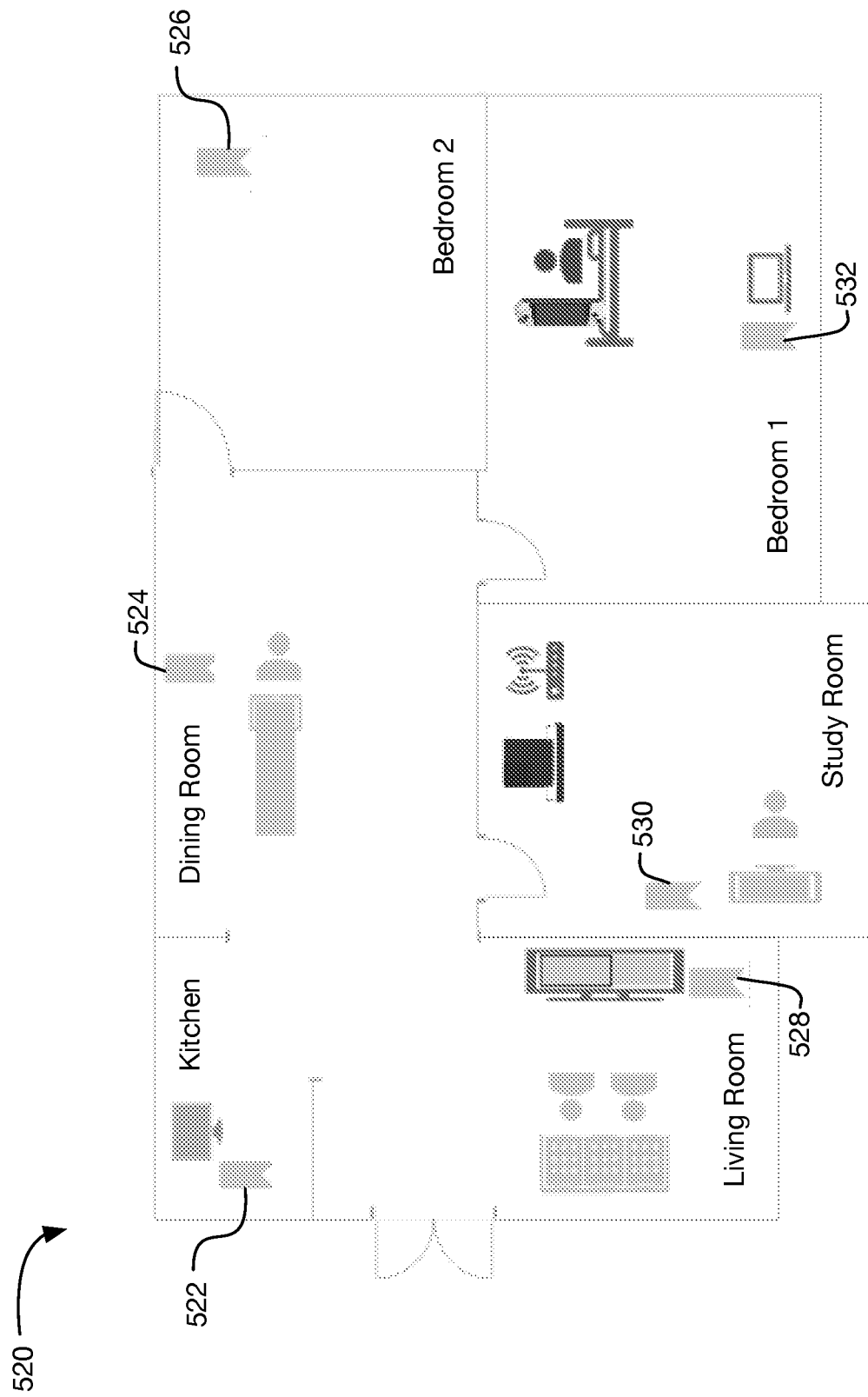
FIG. 5B depicts an environment containing location tags according to an exemplary embodiment of the present disclosure.

As one particular example, FIG. 5B depicts an environment 520 containing location tags according to an exemplary embodiment of the present disclosure. The environment 520 includes location tags 522, 524, 526, 528, 530, 532 positioned in various rooms. In particular, the location tag 522 is positioned in a kitchen, the location tag 524 is positioned in a dining room, the location tag 526 is positioned in a bedroom, the location tag 528 is positioned in a living room, the location tag 530 is positioned in a study room, and the location tag 532 is positioned in another bedroom. Certain location tags are associated with corresponding devices, while others are not. In particular, the locations tags 522, 528, 530, 532 have corresponding devices, while the location tags 524, 526 do not. When the location tags are enrolled or otherwise added to the environment 520, identifiers of the location tags 522, 524, 526, 528, 530, 532 may be received, along with indications of the corresponding rooms and devices (where applicable).

The computing device 402 may be configured to receive path information 416 for a plurality of paths between the plurality of tags. In certain implementations, the path information 416 may include location information 418 for a computing device as the computing device traveled along at least a subset of the plurality of paths. For example, a second computing device, such as the I/O device 412, may be used to record the location information 418.

Figure 5C:
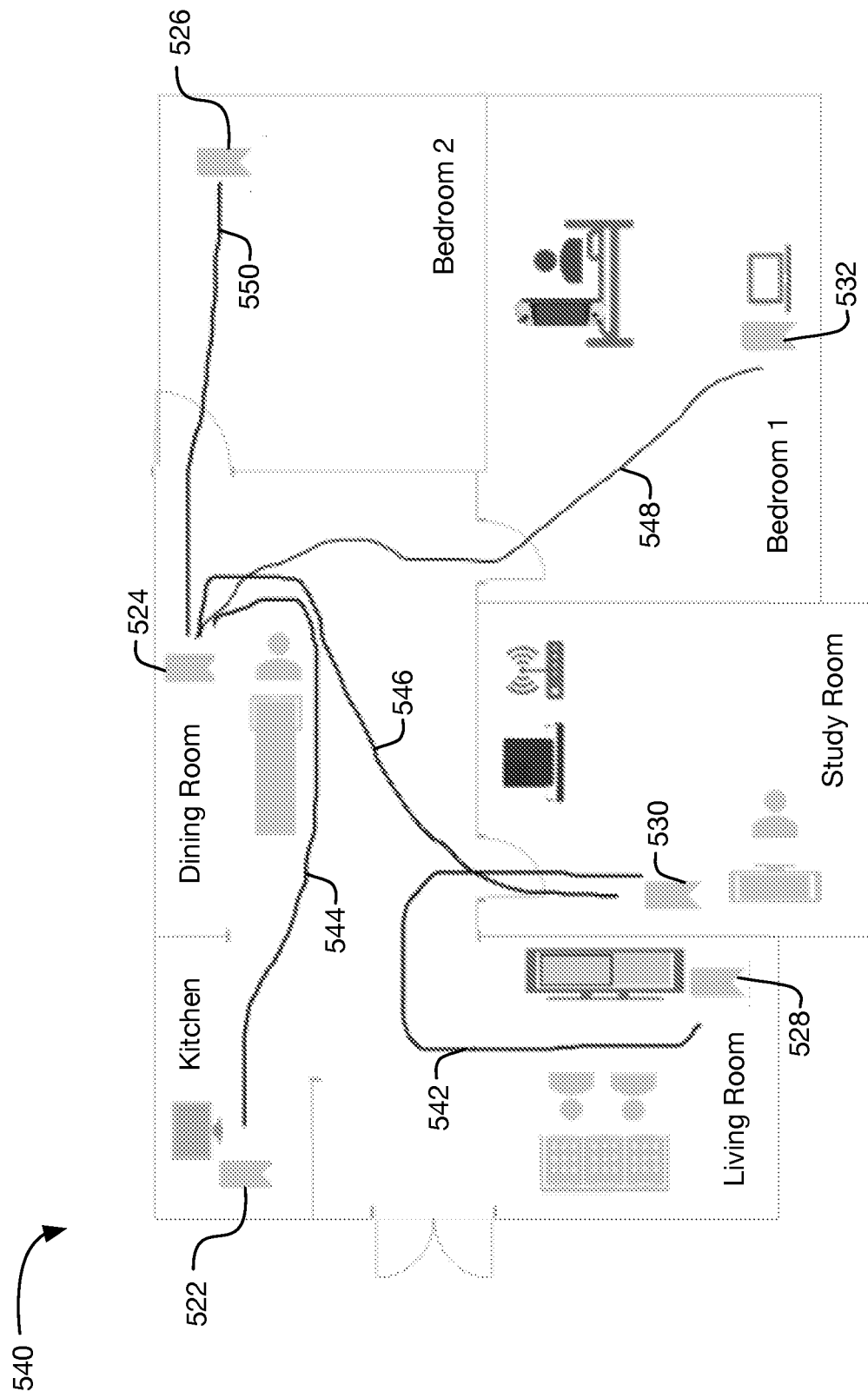
FIG. 5C depicts an environment according to an exemplary embodiment of the present disclosure.

In certain implementations, the location information 418 may include position information at a plurality of times while the computing device 402 travels along at least the subset of the plurality of paths. In certain implementations, the location information 418 may include timestamps and associated position data along with identifiers 414 of corresponding paths. In particular, a user may walk between various pairs of location tags 404 within the environment while holding the second computing device, which may record the position information at the plurality of times (such as at regular intervals). For example, FIG. 5C depicts an environment 540 according to an exemplary embodiment of the present disclosure. The environment 540 is similar to the environment 520, but includes multiple paths 542, 544, 546, 548, 550, between the location tags 522, 524, 526, 528, 530, 532. The paths may have been walked or otherwise traveled between by a user while holding a computing device, such as the I/O device 412 or the controller 500, which may be configured to capture location information 418 while travelling along the paths 542, 544, 546, 548, 550.

In certain implementations, the position information may include relative positions, such as positions relative to a starting position for a first path (such as a temporally first path travelled by the first computing device 402). As another example, the relative positions may include relative positions to one or more of the location tags 404 (such as distances measured between the first computing device 402 and at least a subset of the plurality of location tags 404). In certain implementations, the location information 418 may be determined based on one or more sensor measurements from the computing device 402. In certain implementations, the computing device 402 may perform one or more sensor measurements at different times while travelling along the paths, such as by using one or more of a UWB sensor, a gyroscope sensor, an e-compass sensor, an accelerometer, or combinations thereof. In certain implementations, the location information 418 may be determined based on distance measurements between the computing device 402 and at least a subset of the plurality of tags. In certain implementations, the distance measurements may include one or UWB distance measurements measured by a UWB sensor on the second computing device 412. For example, FIG. 5A depicts a controller 500 according to an exemplary embodiment of the present disclosure. In addition to user input devices such as analog sticks 506, 508, a touch surface 502, and buttons 504, the controller 500 includes a UWB sensor 510 and other sensors 512, including at least one of an accelerometer, a gyroscope, and an e-compass sensor. These sensors 510, 512 may be used to capture information (such as path information 416 or location information 518) while travelling along paths between location tags 404.

In certain implementations, the path information 416 may be received from a computing device other than the computing device 402 (such as the I/O device 412 as discussed above). In additional or alternative implementations, the path information 416 may be received at least in part by the computing device 402. For example, the computing device 402 may include one or more sensors used to determine location information 418 while travelling along paths. In still further implementations, the path information 416 may be received indirectly from the I/O device 412. For example, the I/O device 412 may transmit the path information 416 to a separate computing device (such as a mobile computing device), which may then transmit the path information 416 to the computing device 402. In certain implementations, the device 412 may be a gaming controller. In additional or alternative implementations, the device 412 may be implemented as one or more of a smartphone, a tablet computing device, a mobile computing device, a VR headset, a VR controller, a smartwatch, a portable gaming console, and the like.

In certain implementations, the path information 416 may include image data 420 captured by a device as the device travels along at least a subset of the plurality of paths. In certain implementations, the image data 420 may be received from the same device as the location information 418. In additional or alternative implementations, the image data 420 may be received from a separate device. For example, the location information 418 may be captured by an I/O device and the image data may be captured by a smartphone. In certain implementations, a user may be prompted to capture one or more image frames while traveling along paths between location tags (such as from the middle of one or more rooms within the environment. For example, the user may be prompted to capture panoramic image frames by rotating from a single position along on or more of the paths.

The computing device 402 may be configured to identify a plurality of room contours 422 based on the path information 416. In certain implementations, room contours 422 may include one or more predicted dimensions and locations for rooms, such as a two-dimensional approximated shape of one or more rooms within which the location tags 404 are located. In certain implementations, the room contours 422 for different rooms may be connected or otherwise arranged relative to one another, such as to represent or otherwise approximate a map or floor plan of the environment containing the location tags 404.

Figure 5D:
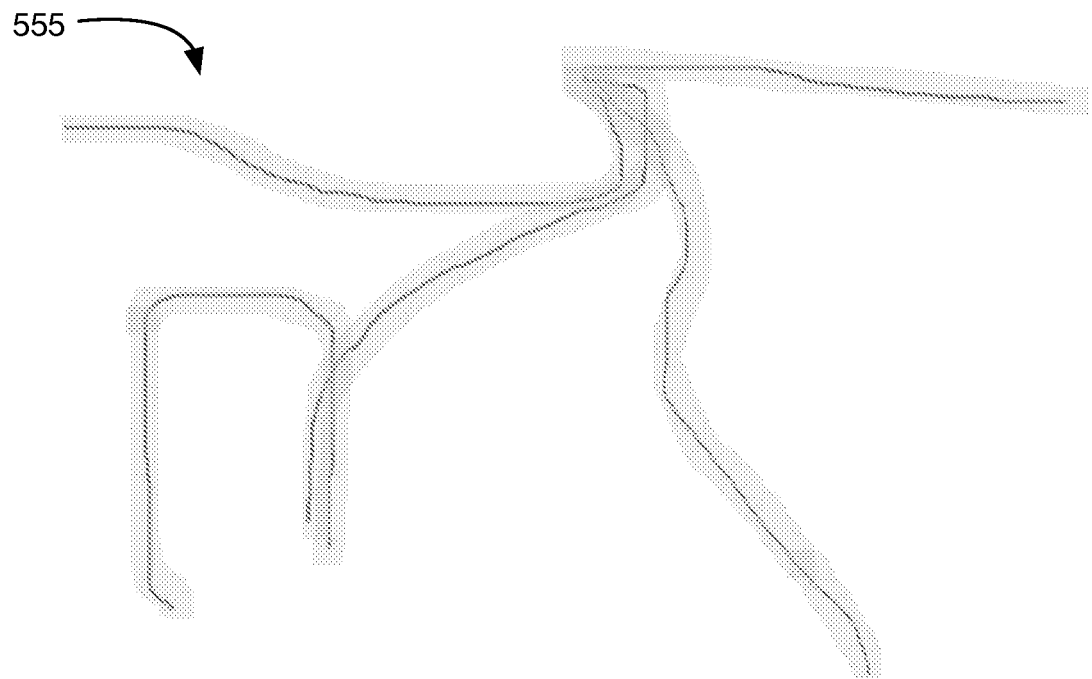
FIG. 5D depicts a consolidated path determined based on the paths according to an exemplary embodiment of the present disclosure.
Figure 5E:
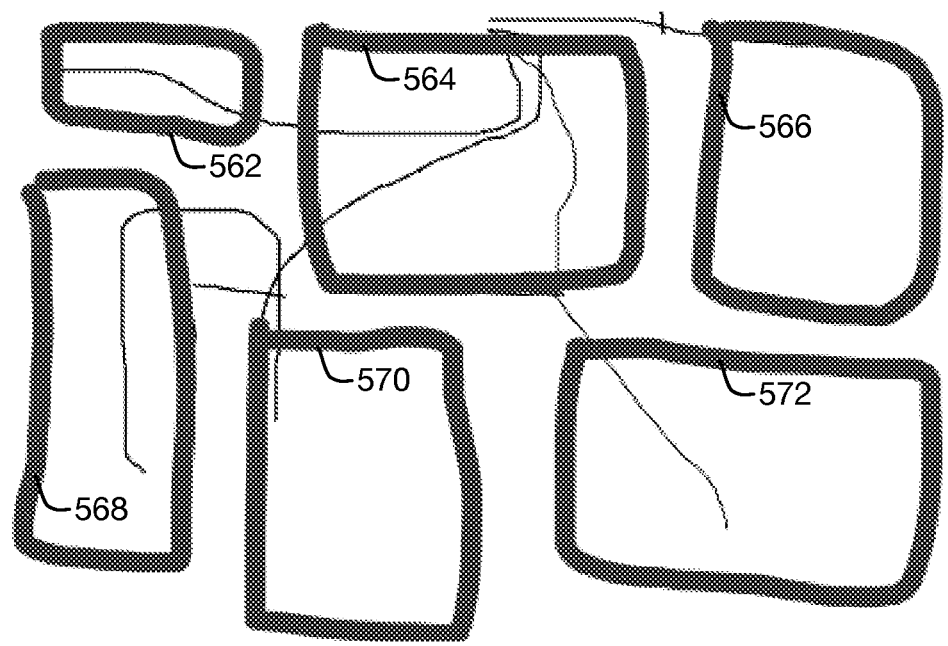
FIG. 5E includes candidate areas formed according to an exemplary embodiment of the present disclosure.

In certain implementations, identifying the room contours may include combining the path information 416 into a consolidated path representative of at least a subset of the plurality of paths and determining a plurality of candidate areas based on the consolidated path. For example, FIG. 5D depicts a consolidated path 555 determined based on the paths 542, 544, 546, 548, 550 according to an exemplary embodiment of the present disclosure. In certain implementations, the candidate areas may be determined by dividing spaces between different portions of the consolidated path 555. For example, FIG. 5E includes candidate areas 562, 564, 566, 568, 570, 572 formed by dividing areas between separate portions of the consolidated path 555. In certain implementations, areas in between multiple paths may be identified as indoor area part of the environment containing the location tags 404. This space may then be divided to form candidate areas 562, 564, 566, 568, 570, 572 according to one or more predetermined criteria. For example, candidate areas may be formed by dividing the space evenly between two adjacent candidate areas. In additional or alternative implementations, the proportion of space between paths assigned to adjacent candidate areas may be adjustable, such as by a user or computing process (such as a machine learning model). In certain implementations, the plurality of room contours 422 may be identified as encompassing the plurality of candidate areas.

In certain implementations, the plurality of candidate areas include widened versions of the path information 416. For example, as shown in FIG. 5D, the consolidated path 555 may be widened by a predetermined amount, such as 0.5 m, 1 m, 0.33 m, 0.1 m, and the like. In certain implementations, the width applied to the consolidated path 555 may be adjustable, such as by a user or computing process (such as a machine learning model).

Figure 5F:
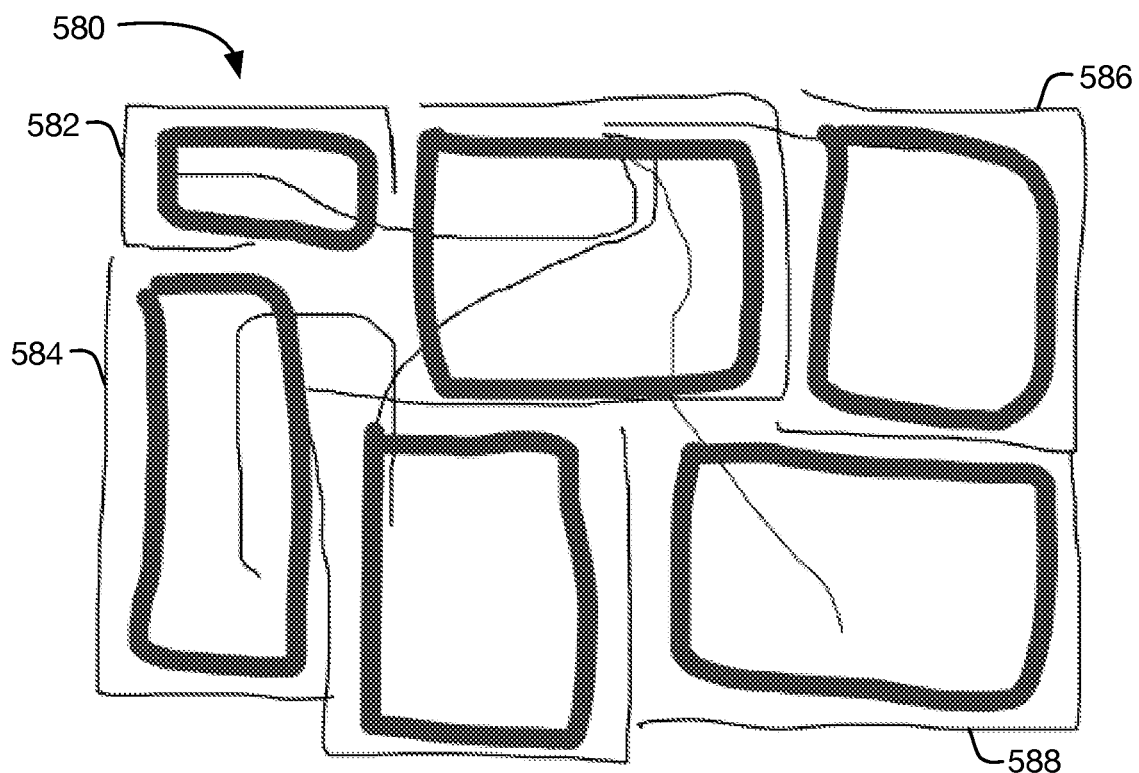
FIG. 5F includes an environment containing detected identified within received image data according to an exemplary embodiment of the present disclosure.

When the path information 416 includes image data 420, identifying the plurality of room contours 422 may include determining, based on the image data 420, at least one of (i) distances to walls along at least the subset of the plurality of paths or (ii) locations of doors along at least the subset of the plurality of paths. In such implementations, the candidate areas may be updated based on the at least one of the distances to walls and locations of doors. For example, the computing device 402 may be configured to detect walls and doors within one or more image frames from the received image data 420 and may compare the relative position of the detected walls and doors within multiple image frames (such as image frames captured from different positions, different angles, using different lenses, or combinations thereof) to determine relative positions or distances from the image sensor used to capture the image data 420. Distances to the detected walls and/or doors may then be determined based on a known or determined position of the image sensor (such as based on corresponding location information 418 identifying where the image data 420 is captured). For example, FIG. 5F includes an environment 580 containing detected 582, 584, 586, 588 identified within received image data 420. In certain implementations, the candidate areas may then be extended to include areas between the paths and the detected walls and doors. Furthermore, detected doors may be used to separate or divide one or more candidate areas, as doors may indicate that the path has crossed into a different room. In this way, the image data 420 may provide more detailed information on the size and distance for rooms within the environment, improving the accuracy of the identified candidate areas and corresponding room contour estimates. In certain implementations, the computing device 402 may be configured to identify when an image frame depicts portions of another room (such as by detecting doors, windows, or other visible portions of other rooms using one or more machine learning models).

Figure 5G:
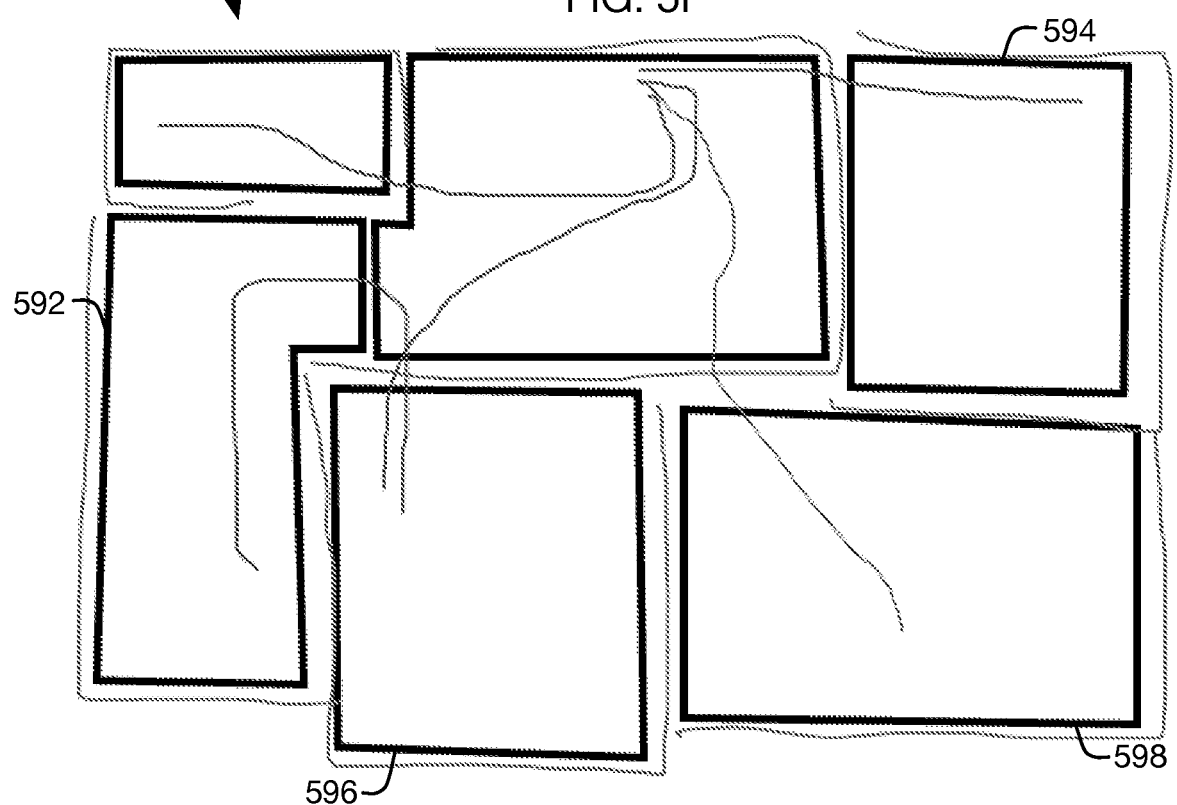
FIG. 5G depicts an environment that contains room contours according to an exemplary embodiment of the present disclosure.

In certain implementations, identifying the plurality of room contours 422 includes determining room contour estimates based on the candidate areas and updating, by a second model, the room contour estimates to form the plurality of room contours 422. In such implementations, updating the initial room contour estimates may include extending the room contour estimates such that at least a subset of the plurality of room contours 422 interconnect or border each other. In certain implementations, the room contour estimates may be extended such that they align with walls and/or door detected within the image data 420. For example, FIG. 5G depicts an environment 590 that contains room contours 592, 594, 596, 598 according to an exemplary embodiment of the present disclosure. The room contours 592, 594, 596, 598 may be determined by updating initial room contour estimates (such as the candidate areas 562, 564, 566, 568, 570, 572) to align with the detected walls 582, 584, 586, 588. The initial room contour estimates may be determined by a model, such as a machine learning model. For example, the model may be trained based on common floorplans in multiple countries or regions to predict floor plans that include room contours typical of floor plans in that country or region. For example, the model may be implemented as one or more machine learning models, including supervised learning models, unsupervised learning models, other types of machine learning models, and/or other types of predictive models. For example, the model may be implemented as one or more of a neural network, a transformer model, a decision tree model, a support vector machine, a Bayesian network, a classifier model, a regression model, and the like. The model may be trained based on training data that specifies one or more expected outputs. Parameters of the model may be updated based on whether the model generates correct outputs when compared to the expected outputs. In particular, the model may receive one or more pieces of input data from the training data sets that are associated with a plurality of expected outputs. The model may generate predicted outputs based on a current configuration of the model. The predicted outputs may be compared to the expected outputs and one or more parameter updates may be computed based on differences between the predicted outputs and the expected outputs. In particular, the parameters may include weights (e.g., priorities) for different features and combinations of features. The parameter updates the model may include updating one or more of the features analyzed and/or the weights assigned to different features or combinations of features (e.g., relative to the current configuration of the model).

The computing device 402 may be configured to determine, based on the plurality of room contours 422 and at least one of the plurality of location tags 404, a display 424 for use in a computing session. The computing session may include the use of a computing device (such as one of the devices 406, 408, 410) to execute one or more computing processes (such as one or more video games, communication programs, professional programs, and the like). The computing device may have a corresponding display that is used to depict the results of the computing process, or for use while the computing process is in progress (such as while the user is playing a video game).

In certain implementations, determining the display 424 includes determining a position for an I/O device 412 to be used during the computing session, such as based on one or more distance measurements between the I/O device 412 and one or more of the location tags 404. A current room of the I/O device 412 may be determined based on the position and the room contours 422. In certain implementations, the room contours may be used to determine the current room of the I/O device 412. For example, the computing device 402 may compare the current position to the room contours 422 to identify a room with a corresponding room contour that contains the identified position of the I/O device 412. In such instances, the display 424 may be identified as being located in the same room as the I/O device 412. The display 424 may be identified based on a room indication or position indication for a location tag 404 associated with the display 424. For example, the computing device 402 may identify a location tag 404 that is contained in the same room as the I/O device 412. As another example, the computing device 402 may identify a display 424 with a corresponding room identifier that is the same as the room in which the I/O device 412 is located. In certain instances, if multiple displays are located in the same room as the I/O device 412, the computing device 402 may identify the closest display 424 within the same room as the I/O device 412 (such as a display 424 whose corresponding location tag is located closest to the position within the current room).

In certain implementations, room contours 422 may also be used to assist users in navigating from room to room. In further implementations, the room contours 422 may be used to assist with locating a device with a corresponding location tag. For example, the computing device 402 may determine a position for a location tag 404 associated with a device or other object (such as a portable object, personal, animal, and the like). The position may be compared to the room contours 422 to identify a room with a corresponding room contour that contains the identified position. An alert or guidance may then be presented or displayed to indicate the room in which the location tag (and thus the corresponding object) are located.

In certain implementations, additional tags may be added to an environment for which room contours 422 have already been identified (such as the environment 520). In such instances, an identifier for a new tag may be received containing similar information to the identifiers 414. For example, the identifier may identify a room in which the new tag is located. A position of the location tag may then be determined, such as by measuring the distance from the new tag to one or more existing tags in the environment. In certain implementations, updated path information may be received for paths between the new tag and existing tags within the environment. In such instances, the room contours 422 may be updated using techniques similar to those discussed above to generate the room contours 422.

The above-discussed techniques accordingly enable the improved generation of room contours for environments such as indoor environments, without requiring excessive user measurement or path determination. Instead, it is possible for a user to walk between location tags within an environment and use the trajectory of the paths travelled to infer interior room geometry. Furthermore, users are not required to utilize specialized distance measuring hardware, or to manually walk along a boundary of the environment or to walk multiple paths between the location tags. Furthermore, image data may be utilized to further improve the distance measurements and interior mapping where beneficial, allowing for even more accurate internal mapping. The improved room contours may then be used to enable seamless switching of peripherals and other I/O devices between multiple computing devices for use during computing sessions. Additionally or alternatively, the improved positioning and room contours may enable better tracking of objects with associated location tags within the environment.

Figure 6:
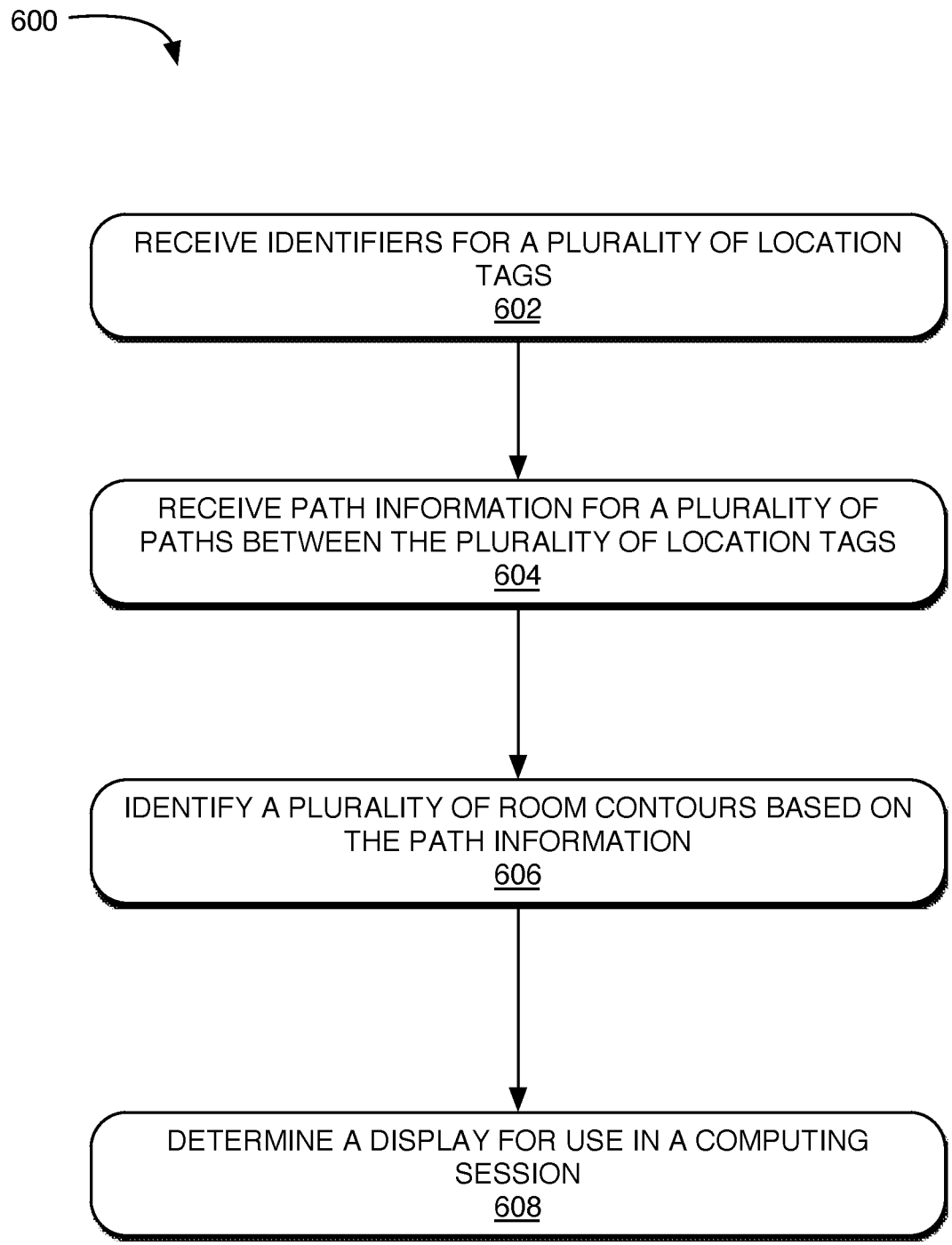
FIG. 6 depicts a method 600 for determining room contours according to an exemplary embodiment of the present disclosure.

FIG. 6 depicts a method 600 for determining room contours according to an exemplary embodiment of the present disclosure. The method 600 may be implemented on a computer system, such as the system 400. For example, the method 600 may be implemented by the computing device 402. The method 600 may also be implemented by a set of instructions stored on a computer readable medium that, when executed by a processor, cause the computing device to perform the method 600. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks may be optional.

The method 600 includes receiving identifiers for a plurality of location tags added to an environment (block 602). For example, the computing device 402 may receive identifiers 414 for a plurality of location tags 404 added to an environment. In certain implementations, the location tags 404 are configured to emit a wireless signal that can be used to measure a distance between the location tags 404 and one or more other computing devices 402. In certain implementations, the plurality of location tags 404 include ultra-wide band location tags 404. In certain implementations, the identifiers 414 may include a unique identifier for each of the plurality of location tags 404. The identifiers 414 may also indicate a room within the house in which the location tag may be located and/or an associated computing device 402.

The method 600 includes receiving path information for a plurality of paths between the plurality of tags (block 604). For example, the computing device 402 may receive path information 416 for a plurality of paths between the plurality of tags. In certain implementations, the path information 416 may include location information 418 for a device as the device traveled along at least a subset of the plurality of paths. In certain implementations, the location information 418 may include position information at a plurality of times while the device travels along at least the subset of the plurality of paths. In certain implementations, the location information 418 may be determined based on distance measurements between the device and at least a subset of the plurality of location tags 404, such as one or UWB distance measurements. In certain implementations, the path information 416 may include image data 420 captured by a computing device 402 as the computing device 402 traveled along at least a subset of the plurality of paths.

The method 600 includes identifying a plurality of room contours based on the path information (block 606). For example, the computing device 402 may identify a plurality of room contours 422 based on the path information 416. In certain implementations, room contours 422 may include one or more predicted dimensions and locations for rooms, such as a two-dimensional approximated shape of one or more rooms within which the location tags 404 are located. In certain implementations, the method 600 may further include combining the path information 416 into a consolidated path representative of at least a subset of the plurality of paths and determining a plurality of candidate areas based on the consolidated path. In certain implementations, the candidate areas are determined by dividing spaces between different portions of the consolidated path. In certain implementations, identifying the plurality of room contours 422 includes determining, based on image data 420, at least one of (i) distances to walls along at least the subset of the plurality of paths or (ii) locations of doors along at least the subset of the plurality of paths and updating the candidate areas based on the at least one of the distances to walls and locations of doors. In certain implementations, identifying the plurality of room contours 422 includes determining room contour estimates based on the candidate areas, updating, by a model, the room contour estimates to form the plurality of room contours 422. In such implementations, updating the initial room contour estimates may include extending the room contour estimates such that at least a subset of the plurality of room contours 422 are adjacent.

The method 600 includes determining, based on the plurality of room contours and at least one of the plurality of location tags, a display for use in a computing session (block 608). For example, the computing device 402 may determine, based on the plurality of room contours 422 and at least one of the plurality of location tags 404, a display 424 for use in a computing session. In certain implementations, determining the display 424 includes determining a position for an I/O device 412 to be used during the computing session, determining a current room of the I/O device 412 based on the position and the room contours 422, and identifying the display 424 as being located in the same room as the I/O device 412.

Figure 7:
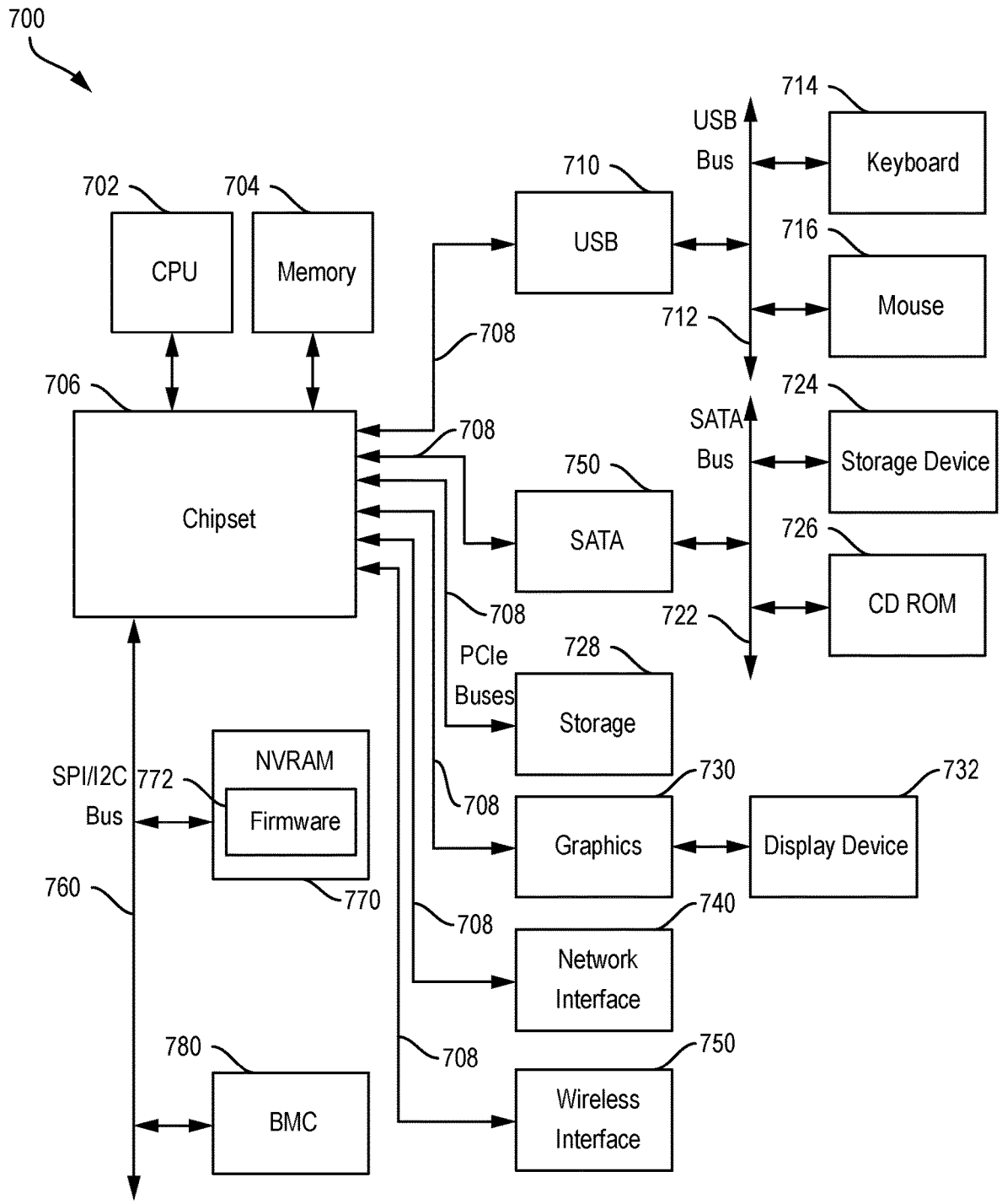
FIG. 7 illustrates an information handling system according to an exemplary embodiment of the present disclosure.

FIG. 7 illustrates an example information handling system 700. Information handling system 700 may include a processor 702 (e.g., a central processing unit (CPU)), a memory (e.g., a dynamic random-access memory (DRAM)) 704, and a chipset 706. In some embodiments, one or more of the processor 702, the memory 704, and the chipset 706 may be included on a motherboard (also referred to as a mainboard), which is a printed circuit board (PCB) with embedded conductors organized as transmission lines between the processor 702, the memory 704, the chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 702, the memory 704, the chipset 706, and/or other components may be organized as a System on Chip (SoC).

The processor 702 may execute program code by accessing instructions loaded into memory 704 from a storage device, executing the instructions to operate on data also loaded into memory 704 from a storage device, and generate output data that is stored back into memory 704 or sent to another component. The processor 702 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 702 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 706 may facilitate the transfer of data between the processor 702, the memory 704, and other components. In some embodiments, chipset 706 may include two or more integrated circuits (ICs), such as a northbridge controller coupled to the processor 702, the memory 704, and a southbridge controller, with the southbridge controller coupled to the other components such as USB 710, SATA 720, and PCIe buses 708. The chipset 706 may couple to other components through one or more PCIe buses 708.

Some components may be coupled to one bus line of the PCIe buses 708, whereas some components may be coupled to more than one bus line of the PCIe buses 708. One example component is a universal serial bus (USB) controller 710, which interfaces the chipset 706 to a USB bus 712. A USB bus 712 may couple input/output components such as a keyboard 714 and a mouse 716, but also other components such as USB flash drives, or another information handling system. Another example component is a SATA bus controller 720, which couples the chipset 706 to a SATA bus 722. The SATA bus 722 may facilitate efficient transfer of data between the chipset 706 and components coupled to the chipset 706 and a storage device 724 (e.g., a hard disk drive (HDD) or solid-state disk drive (SDD)) and/or a compact disc read-only memory (CD-ROM) 726. The PCIe bus 708 may also couple the chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 706 may also be coupled to a serial peripheral interface (SPI) and/or Inter-Integrated Circuit (I2C) bus 760, which couples the chipset 706 to system management components. For example, a non-volatile random-access memory (NVRAM) 770 for storing firmware 772 may be coupled to the bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

System 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of system 700.

Firmware 772 may include instructions executable by processor 702 to initialize and test the hardware components of system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of system 700 may be configured and enabled for operation and device drivers may be installed. Device drivers may provide an interface through which other components of the system 700 can communicate with a corresponding device. The firmware 772 may include a basic input-output system (BIOS) and/or include a unified extensible firmware interface (UEFI). Firmware 772 may also include one or more firmware modules of the information handling system. Additionally, configuration settings for the firmware 772 and firmware of the information handling system 700 may be stored in the NVRAM 770. NVRAM 770 may, for example, be a non-volatile firmware memory of the information handling system 700 and may store a firmware memory map namespace of the information handling system 700. NVRAM 770 may further store one or more container-specific firmware memory map namespaces for one or more containers concurrently executed by the information handling system.

Information handling system 700 may include additional components and additional busses, not shown for clarity. For example, system 700 may include multiple processor cores (either within processor 702 or separately coupled to the chipset 706 or through the PCIe buses 708), audio devices (such as may be coupled to the chipset 706 through one of the PCIe busses 708), or the like. While a particular arrangement of bus technologies and interconnections is illustrated for the purpose of example, one of skill will appreciate that the techniques disclosed herein are applicable to other system architectures. System 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, the information handling system 700 may include a server comprising multiple processors for parallel processing. In some embodiments, the information handling system 700 may support virtual machine (VM) operation, with multiple virtualized instances of one or more operating systems executed in parallel by the information handling system 700. For example, resources, such as processors or processing cores of the information handling system may be assigned to multiple containerized instances of one or more operating systems of the information handling system 700 executed in parallel. A container may, for example, be a virtual machine executed by the information handling system 700 for execution of an instance of an operating system by the information handling system 700. Thus, for example, multiple users may remotely connect to the information handling system 700, such as in a cloud computing configuration, to utilize resources of the information handling system 700, such as memory, processors, and other hardware, firmware, and software capabilities of the information handling system 700. Parallel execution of multiple containers by the information handling system 700 may allow the information handling system 700 to execute tasks for multiple users in parallel secure virtual environments.

The schematic or flow chart diagrams of FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving identifiers for a plurality of location tags added to an environment;
   receiving path information for a plurality of paths between the plurality of location tags;
   combining the path information into a consolidated path representative of at least a subset of the plurality of paths;
   determining a plurality of candidate areas based on the consolidated path;
   identifying a plurality of room contours based on the path information, the plurality of room contours surrounding the plurality of candidate areas, wherein identifying the plurality of room contours comprises:
      determining room contour estimates based on the candidate areas; and
      updating, by a model, the room contour estimates to form the plurality of room contours, wherein updating the room contour estimates includes extending the room contour estimates such that at least a subset of the plurality of room contours align; and
   determining, based on the plurality of room contours and at least one of the plurality of location tags, a display for use in a computing session.

2. The method of claim 1, wherein the path information includes location information for a computing device as the computing device traveled along at least a subset of the plurality of paths.

3. The method of claim 2, wherein the location information is determined based on one or more sensor measurements from the computing device.

4. The method of claim 2, wherein the location information is determined based on distance measurements between the computing device and at least a subset of the plurality of tags.

5. The method of claim 1, wherein the candidate areas are determined by dividing spaces between different portions of the consolidated path.

6. The method of claim 1, wherein the path information includes image data captured by a computing device as the computing device traveled along at least a subset of the plurality of paths.

7. The method of claim 6, wherein identifying the plurality of room contours further comprises:
   determining, based on the image data, at least one of (i) distances to walls along at least the subset of the plurality of paths or (ii) locations of doors along at least the subset of the plurality of paths; and updating the candidate areas based on the at least one of the distances to walls and locations of doors.

8. The method of claim 1, wherein determining the display comprises:
   determining a position for an I/O device to be used during the computing session;
   determining a current room of the I/O device based on the position and the room contours; and
   identifying the display as being located in the current room.

9. The method of claim 1, wherein the plurality of location tags include ultra-wide band location tags.

10. The method of claim 1, wherein the model is a machine learning model trained based on one or more floorplans from among one or more regions of one or more countries.

11. An information handling system, comprising:
   a memory; and
   a processor coupled to the memory, wherein the processor is configured to perform operations comprising:
      receiving identifiers for a plurality of location tags added to an environment;
      receiving path information for a plurality of paths between the plurality of location tags;
      combining the path information into a consolidated path representative of at least a subset of the plurality of paths;
      determining a plurality of candidate areas based on the consolidated path;
      identifying a plurality of room contours based on the path information, the plurality of room contours surrounding the plurality of candidate areas, wherein identifying the plurality of room contours comprises:
         determining room contour estimates based on the candidate areas; and
         updating, by a model, the room contour estimates to form the plurality of room contours, wherein updating the room contour estimates includes extending the room contour estimates such that at least a subset of the plurality of room contours align; and
      determining, based on the plurality of room contours and at least one of the plurality of location tags, a display for use in a computing session.

12. The information handling system of claim 11, wherein the path information includes image data captured by a computing device as the computing device traveled along at least a subset of the plurality of paths.

13. The information handling system of claim 12, wherein identifying the plurality of room contours further comprises:

determining, based on the image data, at least one of (i) distances to walls along at least the subset of the plurality of paths or (ii) locations of doors along at least the subset of the plurality of paths; and updating the candidate areas based on the at least one of the distances to walls and locations of doors.

14. The information handling system of claim 11, wherein the model is a machine learning model trained based on one or more floorplans from among one or more regions of one or more countries.

15. A non-transitory, computer-readable medium, storing instructions which, when executed by a processor, cause the processor to perform operations comprising:
   receiving identifiers for a plurality of location tags added to an environment;
   receiving path information for a plurality of paths between the plurality of location tags;
   combining the path information into a consolidated path representative of at least a subset of the plurality of paths;
   determining a plurality of candidate areas based on the consolidated path;
   identifying a plurality of room contours based on the path information, the plurality of room contours surrounding the plurality of candidate areas, wherein identifying the plurality of room contours comprises:
      determining room contour estimates based on the candidate areas; and
      updating, by a model, the room contour estimates to form the plurality of room contours, wherein updating the room contour estimates includes extending the room contour estimates such that at least a subset of the plurality of room contours align; and
   determining, based on the plurality of room contours and at least one of the plurality of location tags, a display for use in a computing session.

16. The non-transitory, computer-readable medium of claim 15, wherein the path information includes image data captured by a computing device as the computing device traveled along at least a subset of the plurality of paths.

17. The non-transitory, computer-readable medium of claim 16, wherein identifying the plurality of room contours further comprises:
   determining, based on the image data, at least one of (i) distances to walls along at least the subset of the plurality of paths or (ii) locations of doors along at least the subset of the plurality of paths; and
   updating the candidate areas based on the at least one of the distances to walls and locations of doors.

* * * * *